US008042059B2

(12) United States Patent
Park

(10) Patent No.: US 8,042,059 B2
(45) Date of Patent: Oct. 18, 2011

(54) SYSTEM FOR PROVIDING MULTIPLE WINDOW ENVIRONMENTS IN A MOBILE COMPUTING SYSTEM AND METHOD THEREOF

(75) Inventor: Ju-Young Park, Seongnam-si (KR)

(73) Assignee: Samsung Electronics Co., Ltd (KR)

( * ) Notice: Subject to any disclaimer, the term of this patent is extended or adjusted under 35 U.S.C. 154(b) by 2008 days.

(21) Appl. No.: 10/946,764

(22) Filed: Sep. 22, 2004

(65) Prior Publication Data

US 2005/0177700 A1     Aug. 11, 2005

(30) Foreign Application Priority Data

Feb. 10, 2004    (KR) .................. 10-2004-0008749

(51) Int. Cl.
*G06F 3/048* (2006.01)
(52) U.S. Cl. .................. 715/804; 711/173; 711/202
(58) Field of Classification Search .............. 715/804, 715/778; 711/173, 202
See application file for complete search history.

(56) References Cited

U.S. PATENT DOCUMENTS

| | | | | |
|---|---|---|---|---|
| 5,596,702 A | * | 1/1997 | Stucka et al. | 715/746 |
| 5,642,303 A | * | 6/1997 | Small et al. | 708/109 |
| 6,445,973 B1 | * | 9/2002 | Sagasaki et al. | 700/180 |
| 7,069,519 B1 | * | 6/2006 | Okude et al. | 715/778 |
| 7,170,881 B2 | * | 1/2007 | Chaskar | 370/338 |

* cited by examiner

*Primary Examiner* — William L Bashore
*Assistant Examiner* — Sherrod Keaton
(74) *Attorney, Agent, or Firm* — The Farrell Law Firm, P.C.

(57) ABSTRACT

Disclosed is a system for providing multiple window environments in a mobile computing system and a method thereof, which enables a user to conveniently and selectively use a window system suitable for the use environment. A plurality of sub-window systems having different user interfaces and application programs are installed in separate user partitions provided in a non-volatile memory. If a predetermined event occurs, a currently executing sub-window system, from among the plurality of sub-window systems, is terminated, and a user partition corresponding to the terminated sub-window system is dismounted. Then, a user partition from among the separate user partitions, designated corresponding to the predetermined event is mounted so that the sub-window system of the mounted user partition is executed.

13 Claims, 4 Drawing Sheets

SYSTEM FOR PROVIDING MULTIPLE WINDOW ENVIRONMENTS IN A MOBILE COMPUTING SYSTEM AND METHOD THEREOF

PRIORITY

This application claims priority to an application entitled "System For Providing Multiple Window Environments in Mobile Computing System and Method Thereof" filed in the Korean Industrial Property Office on Feb. 10, 2004 and assigned Serial No. 2004-8749, the contents of which are hereby incorporated by reference.

BACKGROUND OF THE INVENTION

1. Field of the Invention

The present invention relates generally to a portable terminal, and more particularly to a system for providing multiple window environments in a portable terminal adopting a mobile computing system having a non-volatile memory and a method thereof.

2. Description of the Related Art

Typically, a mobile computing system, which is adopted in various kinds of portable terminals such as PDAs (Personal Digital Assistants), smart phones, etc., has one OS (Operating System) image installed in a programmable non-volatile memory. A flash memory is typically used as the programmable non-volatile memory.

FIG. 1 illustrates a memory map of a programmable non-volatile memory provided in a typical mobile computing system. The programmable non-volatile memory 100 has an area in which a boot loader 102, a kernel 104, a root file system 106, and a window system 108 are stored, and a storage area 110, used to store data required for the execution of the window system 108.

The boot loader 102 is a boot code having a size of about 100 Kbytes, which starts when a CPU (Central Processing Unit) is reset. The kernel 104 and the root file system 106 are the minimum OS codes required for the operation of the window system 108, and commonly have a size of about 3 Mbytes. The window system 108 is composed of a user interface, an application program, and commonly has a size of about 20 Mbytes to 30 Mbytes.

In the mobile computing system having a non-volatile memory 100 as described above, during a booting operation of the system, the boot loader 102 initializes the CPU, memory and peripheral devices (not illustrated), copies itself, the kernel 104 and the root file system 106 into a memory, i.e., RAM (Random Access Memory), and then assigns a control authority to the kernel 104.

Then, the kernel 104 activates a system service related to the OS, mounts the root file system 106, and then assigns the control authority to the root file system 106. The root file system 106 executes the window system 108 through its initialization routine. If the window system 108 is executed, all the system booting processes are terminated.

Since the mobile computing system is not adopted in devices such as a PC (Personal Computer) used in a fixed place or for a fixed purpose, but is adopted in a portable terminal that is carried by a user, its purpose may be repeatedly changed even during a day. By contrast, a typical mobile computing system has only one OS image as described above, and thus if the user intends to use an OS image having a new function according to the use environment, he/she must remove the existing OS image installed in the non-volatile memory, and install a different OS image instead.

The programmable non-volatile memory used in the mobile computing system has a memory capacity of more than 1 Gbytes, and this memory capacity is constantly increasing. However, since only about 40 Mbytes of memory are actually used, even if all the code areas and data storage area are put together as described above, the most of the available storage area may not be used unless a great amount of data such as a GPS (Global Positioning System) map is used in the mobile computing systems.

SUMMARY OF THE INVENTION

Accordingly, the present invention has been made to solve the above-mentioned problems occurring in the prior art, and an object of the present invention is to provide a system for providing multiple window environments in a mobile computing system and a method thereof which enables a user to conveniently and selectively use a window system suitable for a use environment.

Another object of the present invention is to provide a system for providing multiple window environments in a mobile computing system and a method thereof, which can automatically provide a window system suitable for a use environment.

Still another object of the present invention is to provide a system for providing multiple window environments in a mobile computing system and a method thereof, which can independently provide window systems suitable for respective use environments.

Still another object of the present invention is to provide a system for providing multiple window environments in a mobile computing system and a method thereof, which can make the best use of a storage area of a programmable non-volatile memory.

In order to accomplish these objects and in accordance with the present invention, a plurality of sub-window systems having different user interfaces and application programs are installed in different user partitions separately provided in a non-volatile memory. If a predetermined event occurs, a sub-window system from among the plurality of sub-window systems, which is being executed, is terminated, and a user partition corresponding to the terminated sub-window system is dismounted. Then, a user partition designated corresponding to the predetermined event among the user partitions is mounted so that the sub-window system of the mounted user partition is executed.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, a system for providing multiple window environments in a mobile computing system and a method thereof according to preferred embodiments of the present invention will be described with reference to the accompanying drawings. In the following description of the present invention, a detailed description of known functions and configurations incorporated herein will be omitted when it may make the subject matter of the present invention unclear.

Figure 2:
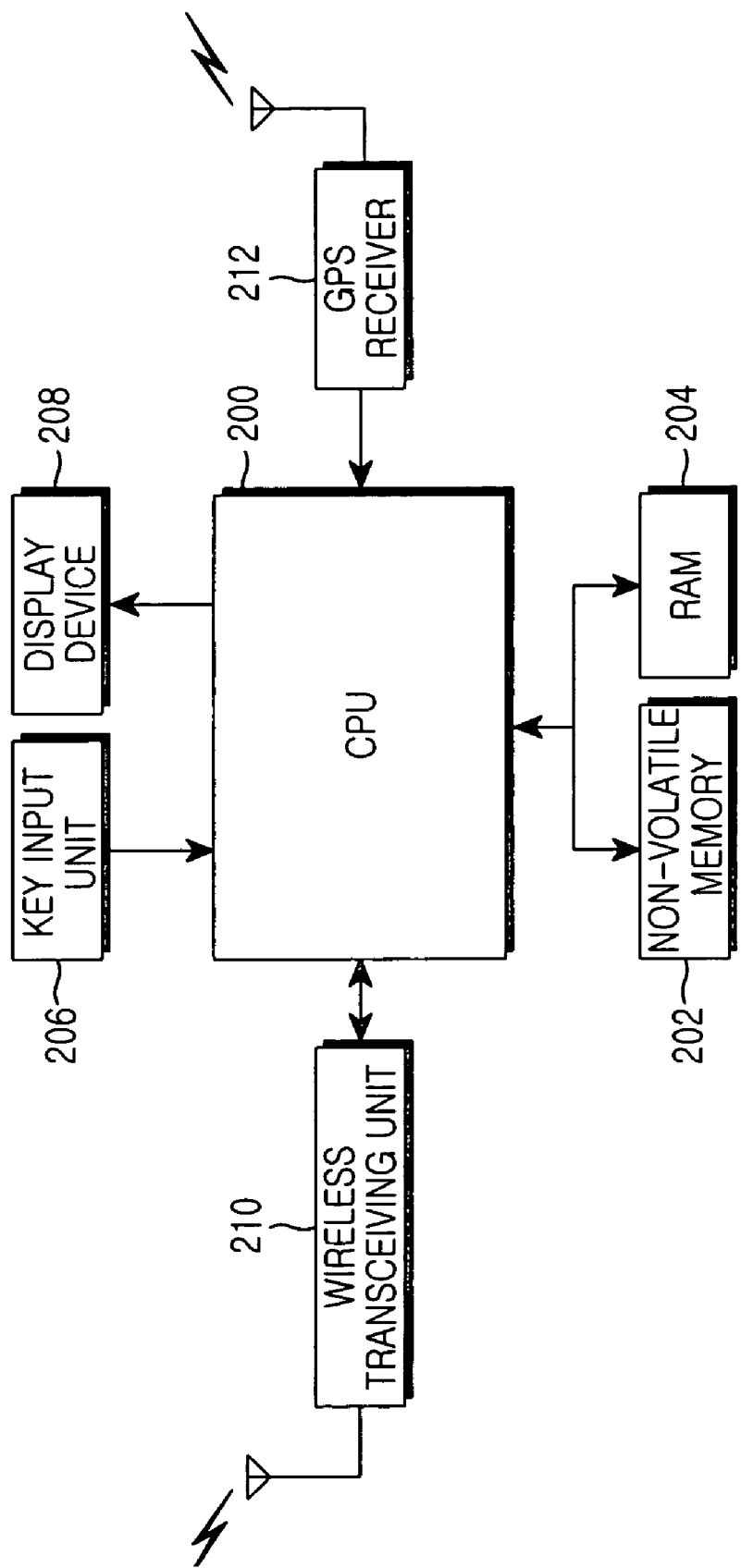
FIG. 2 is a block diagram of a portable terminal in which a system for providing multiple window environments according an embodiment of the present invention is applied.
Figure 3:
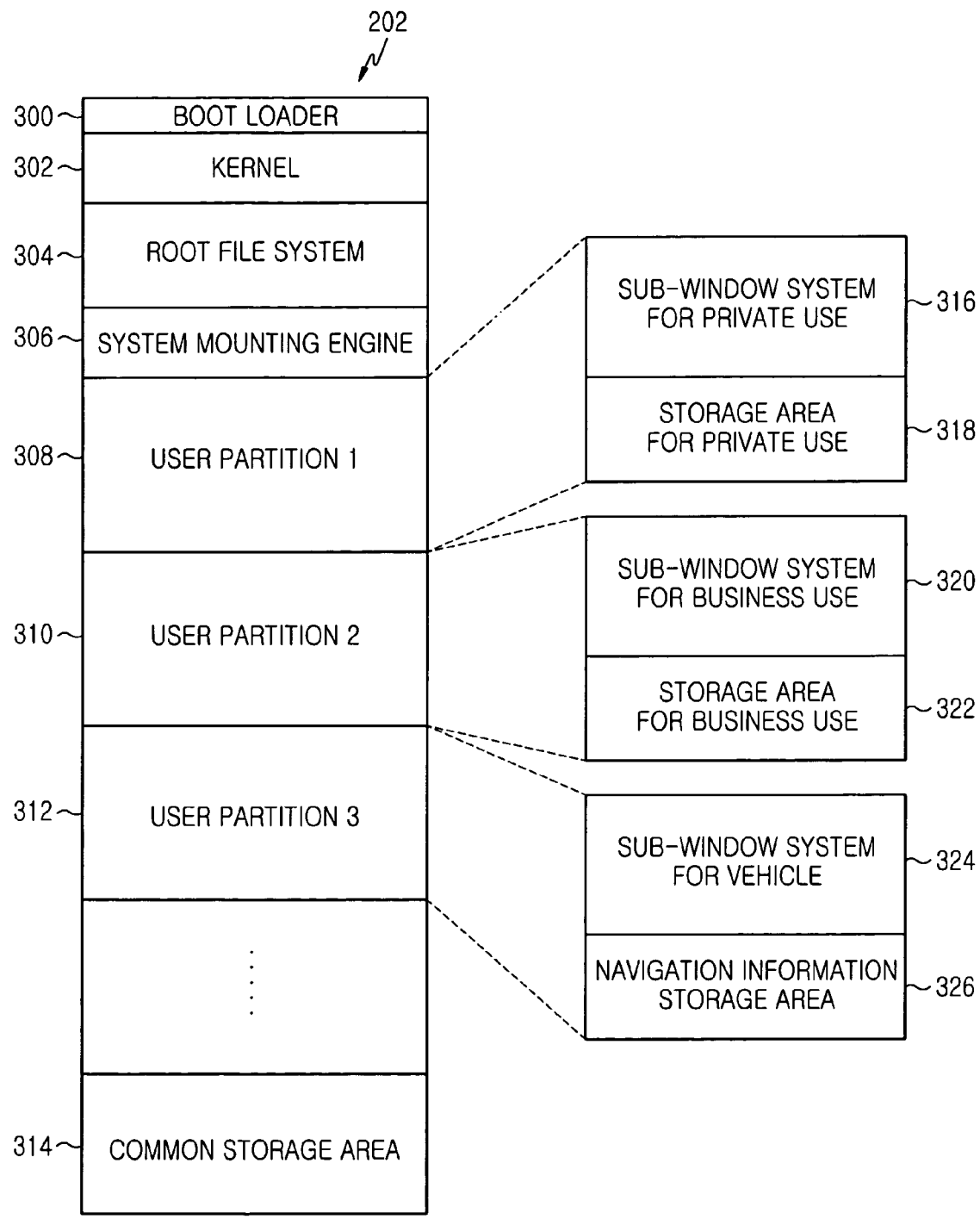
FIG. 3 is a block diagram of a memory map of a programmable non-volatile memory in which a system for providing multiple window environments according to an embodiment of the present invention is applied.

FIG. 2 is a block diagram illustrating the construction of a portable terminal in which a system for providing multiple window environments according an embodiment of the present invention is applied. In FIG. 2, a mobile phone having a WLAN (Wireless Local Area Network) connection function and a positioning function using a GPS (Global Positioning System) is shown. In FIG. 2, a CPU (Central Processing Unit) 200 executes a system function of providing multiple window environments installed in a programmable non-volatile memory 202 as shown in FIG. 3 and described below according to an embodiment of the present invention. A RAM (Random Access Memory) 204 is provided as a working memory of the CPU 200. A key input unit 206 is provided with numeral keys of 0 to 9 and a plurality of function keys, for providing key input data corresponding to a key pressed by a user to the CPU 200. A display device 208 displays image information under the control of the CPU 200. A wireless transceiving unit 210 provides a wireless connection with a mobile communication base station and a WLAN. A GPS receiver 212 receives a signal from a GPS satellite and provides position information to the CPU 200.

Figure 1:
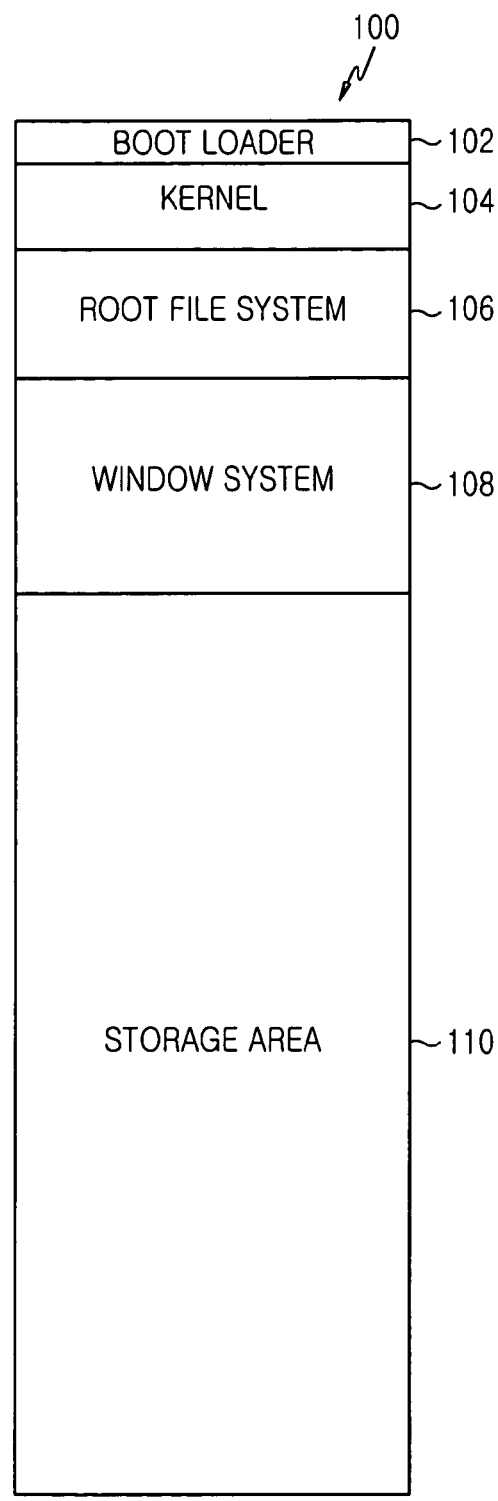
FIG. 1 is a block diagram of a memory map of a programmable non-volatile memory provided in a typical mobile computing system

In the non-volatile memory 202, shown in FIG. 3, a system mounting engine 306 and a plurality of user partitions 308 to 312 are installed in addition to a boot loader 300, a kernel 302 and a root file system 304 in the same manner as the non-volatile memory as illustrated in FIG. 1. The non-volatile memory 202 also includes a common storage area 314. In the user partitions 308 to 312, a plurality of sub-window systems, which are composed of different user interfaces and application programs, are separately installed one by one. FIG. 3 shows three kinds of sub-window systems, i.e., a sub-window system 316 for individual use, a sub-window system 320 for business use, and a sub-window system 324 for use in a vehicle, which are installed in the three user partitions 308 to 312 respectively. The user partitions 308 to 312 also include storage areas used by the respective sub-window systems, i.e., a storage area 318 for individual use, a storage area 322 for business use and a navigation information storage area 326 for use in a vehicle.

The sub-window system 316 for individual use, the sub-window system 320 for business use, and the sub-window system 324 for use in a vehicle are independent window systems each of which has a user interface and an application program suitable for a respective use environment so that a user can selectively use a mobile computing system of a portable terminal as shown in FIG. 2 for individual use, for business use, or for use in a vehicle. The sub-window system 316 for individual use is a window system, which is composed of a user interface and an application program for a window environment required for the user's individual use. The sub-window system 320 for business use is a window system, which is composed of a user interface and an application program for a window environment required for the user's business use in his/her place of work. The sub-window system 324 for use in a vehicle is a window system, which is composed of a user interface and an application program for a window environment required for the use in a vehicle. That is, unlike one fixed window system installed in various use environments as shown in FIG. 1, plurality of window systems are separately installed in different partitions of a non-volatile memory 202 according to the embodiment of the present invention.

During a booting operation of the mobile computing system, the boot loader 300, kernel 302 and the root file system 304 are sequentially executed in the same manner as described above, and the initialization routine of the root file system 304 executes a sub-window system of a user partition selected among user partitions 308 to 312, for example, a user partition set as a default.

Figure 4:
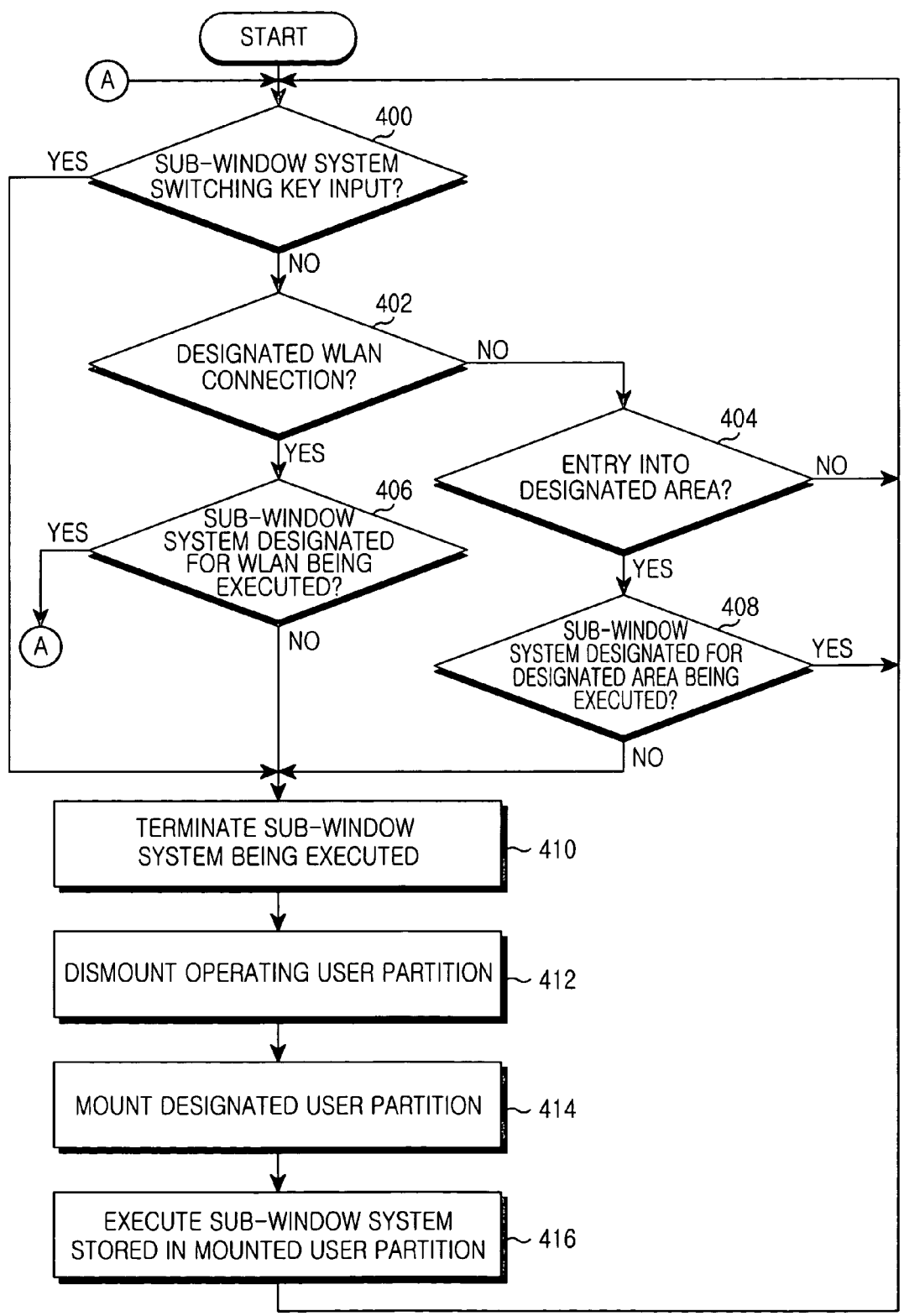
FIG. 4 is a flowchart illustrating a process performed by a system mounting engine according to an embodiment of the present invention.

In the state as described above, the CPU 200 executes the system mounting engine 306 according to steps 400 to 416 of FIG. 4 in response to the occurrence of the predetermined event. FIG. 4 is a flowchart illustrating a process performed by the system mounting engine according to an embodiment of the present invention, and shows three cases of a key input for switching the system mounting engine, a designated WLAN connection, and an entry into a designated zone as examples of the predetermined event. The key input for switching the system mounting engine refers to a menu selection prepared for a user's switching of the window system to one of the sub-window system 316 for individual use, the sub-window system 320 for business use, and the sub-window system 324 for use in a vehicle, or to a selection of a hot key for a user's switching of the window system to one of the sub-window system 316 for individual use, the sub-window system 320 for business use, and the sub-window system 324 for use in a vehicle. The WLAN connection refers to a pre-connection of the portable terminal to the WLAN through the wireless transceiving unit 210. The entry into a designated zone refers to a recognition of an entry of the portable terminal into a predetermined zone by positioning through the GPS receiver 212.

At steps 400 to 404, the CPU 200 executes the system mounting engine 306 in response to the user's key input for switching the sub-window system through the key input unit 206 in step 400, the connection of the portable terminal to the designated WLAN through the wireless transceiving unit 210 in step 402, or the entry of the portable terminal into the designated zone in step 404. If the key input for switching the sub-window system is made by the user through the key input unit 206 at step 400, the CPU 200 proceeds to executing step 410. At step 410, the CPU 200 terminates the sub-window system being executed, and dismounts the operating user partition, i.e., the user partition corresponding to the terminated sub-window system, at step 412. Then, in step 414 the CPU 200 mounts the user partition designated corresponding to the key input for switching the sub-window system among the user partitions 308 to 312, and then executes the sub-window system of the mounted user partition at step 416. Thereafter, the CPU 200 returns to the decision steps 400 to 404. Accordingly, the window environment is switched over to the sub-window system selected by the user.

Although the user can manually switch the window system according to the use environment, it would be convenient for the CPU 200 to automatically switch over to a window system suitable for the corresponding use environment in the event that the portable terminal connects with a predetermined WLAN or enters into a predetermined zone. For example, if the portable terminal connects with a WLAN installed in the user's office for work, the CPU 200 switches over to the sub-window system 320 for business use, while if the portable terminal is located in the user's house, the CPU 200 switches over to the sub-window system 316 for private use.

If the portable terminal connects to a designated WLAN through the wireless transceiving unit 210 at step 402, the CPU 200 executes step 406 in response to this. At step 406, the CPU 200 confirms whether the sub-window system designated to the connected WLAN has already been executed. If the sub-window system designated to the connected WLAN has already been executed, it is not required to switch over to the sub-window system, and thus the CPU 200 returns to steps 400 to 404 to keep the execution of the corresponding sub-window system. By contrast, if another sub-window system, which is not the sub-window system designated to the connected WLAN, has been executed, the CPU 200 proceeds to steps 410 to 416 to switch over to a sub-window system designated to the connected WLAN.

If the portable terminal enters into a designated zone at step 404, in response, the CPU 200 executes step 408. At step 408, the CPU 200 confirms whether the sub-window system designated to the zone has already been executed. If the sub-window system designated to the zone has already been executed, it is not required to switch over to the sub-window system, and thus the CPU 200 returns to steps 400 to 404 to keep the execution of the corresponding sub-window system. By contrast, if another sub-window system, which is not the sub-window system designated to the zone, has been executed, the CPU 200 proceeds to steps 410 to 416 to switch over to a sub-window system designated to the zone.

As described above, according to the present invention, the user can simply and conveniently use a window system suitable for a use environment by separately installing window systems suitable for respective use environments in which a portable terminal may be used in different partitions provided in a non-volatile memory and by manually or automatically executing the window system suitable for the use environment. Also, the present invention can make the best use of a storage area of a programmable non-volatile memory.

Although the user's key input for switching the system mounting engine, and the connection of the portable terminal to a designated WLAN and entry into a designated zone have been described as examples of predetermined events for switching the sub-widow systems, at least one of them may be selectively adopted in the system. Also, instead of separately providing storage areas for sub-window systems corresponding to respective user partitions as described above, a common storage area may be used.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A system for providing multiple window environments in a mobile computing system, comprising:
a non-volatile memory for storing
a plurality of user partitions in which a plurality of sub-window systems having different user interfaces and application programs are installed, and
a system mounting engine executable according to the steps of:
detecting occurrence of a predetermined event,
terminating the sub-window system being executed among the sub-window systems,
dismounting the user partition corresponding to the terminated sub-window system,
mounting the user partition designated corresponding to the predetermined event among the user partitions, and
executing the sub-window system of the mounted user partition; and
a central processing unit (CPU) for executing the system mounting engine in response to the occurrence of the predetermined event.

2. The system as claimed in claim 1, wherein the user partitions are provided within storage areas used by the respective sub-window systems.

3. The system as claimed in claim 1, wherein the non-volatile memory is provided with a common storage area for use by the sub-window systems.

4. The system as claimed in claim 1, wherein the predetermined event is a sub-window system switching key input for selecting one of the sub-window systems.

5. The system as claimed in claim 1, wherein the predetermined event is that the portable terminal to which the mobile computing system is applied connects with a designated wireless local area network (WLAN).

6. The system as claimed in claim 1, wherein the predetermined event is the portable terminal to which the mobile computing system is applied entering into a designated zone.

7. The system as claimed in claim 1, wherein the system mounting engine keeps an execution of the corresponding sub-window system if the sub-window system of the designated user partition corresponding to the predetermined event is executed when the predetermined event occurs.

8. A method for providing multiple window environments in a mobile computing system having a programmable non-volatile memory, the method comprising the steps of:
a first step of separately installing a plurality of sub-window systems having different user interfaces and application programs in a plurality of different user partitions provided in the non-volatile memory; and
a second step of terminating a sub-window system being currently executed among the sub-window systems, if a predetermined event occurs,
dismounting the user partition according to the terminated sub-window system,
mounting the user partition designated from among the plurality of user partitions according to the predetermined event, and
executing the sub-window system of the mounted user partition.

9. The method as claimed in claim 8, wherein the plurality of user partitions include storage areas used by the plurality of respective sub-window systems.

10. The method as claimed in claim 8, wherein the predetermined event is a sub-window system switching key input for selecting one of the plurality of sub-window systems.

11. The method as claimed in claim 8, wherein the predetermined event is the portable terminal to which the mobile computing system is applied connecting to a designated wireless local area network (WLAN).

12. The method as claimed in claim 8, wherein the predetermined event is the portable terminal to which the mobile computing system is applied entering into a designated zone.

13. The method as claimed in claim 8, wherein the second step further comprises the step of keeping an execution of the corresponding sub-window system if the sub-window system of the user partition designated corresponding to the predetermined event is executed when the predetermined event occurs.

* * * * *